US011867261B2

(12) United States Patent
Huang et al.

(10) Patent No.: US 11,867,261 B2
(45) Date of Patent: Jan. 9, 2024

(54) TRANSMISSION MECHANISM FOR ELECTRIC DRILL AND ELECTRIC DRILL INCLUDING THE SAME

(71) Applicant: Globe (Jiangsu) Co., Ltd, Jiangsu (CN)

(72) Inventors: Fei Huang, Jiangsu (CN); Zhongjun Wang, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 407 days.

(21) Appl. No.: 17/126,018

(22) Filed: Dec. 17, 2020

(65) Prior Publication Data

US 2021/0190179 A1    Jun. 24, 2021

(30) Foreign Application Priority Data

Dec. 19, 2019    (CN) ......................... 201911318259.X

(51) Int. Cl.
*F16H 1/46*    (2006.01)
*E21B 3/02*    (2006.01)
(Continued)

(52) U.S. Cl.
CPC ................. *F16H 1/46* (2013.01); *E21B 3/02* (2013.01); *E21B 7/028* (2013.01); *E21B 10/44* (2013.01);
(Continued)

(58) Field of Classification Search
CPC .................... F16H 1/46; F16H 57/023; F16H 2057/02039; E21B 10/44; E21B 3/02; E21B 7/028; E21B 11/005
See application file for complete search history.

(56) References Cited

U.S. PATENT DOCUMENTS 10,458,519 B2    10/2019 Guttenberger
2005/0000736 A1*    1/2005 Maki ....................... E21B 10/44
                                                        175/394
2018/0051775 A1    2/2018 Liang

FOREIGN PATENT DOCUMENTS

CN    101407053 A    4/2009
CN    206448768 U    8/2017
(Continued)

OTHER PUBLICATIONS

Extended European Search Report of counterpart European Patent Application No. 20214635.3 dated Apr. 29, 2021.

*Primary Examiner* — Dany E Akakpo

(57) ABSTRACT

The invention provides a transmission mechanism for an electric drill and the electric drill including the transmission mechanism. The transmission mechanism includes a primary planet carrier, a gear assembly, a secondary planet carrier, and a secondary gear assembly. The gear assembly comprises a primary gear ring and a primary gear set located in the primary gear ring. The primary gear set has two primary planetary gear sets mounted on the primary planetary gear shaft. The secondary planet carrier is provided with secondary planetary gear shafts and an output shaft. The secondary gear assembly includes a secondary gear ring and a secondary planetary gear set. The secondary planetary gear set is pivotably mounted on the secondary planetary gear shafts, an outer side of the secondary planetary gear set engages with the secondary gear ring, and an inner side of thereof engages with the sun gear.

9 Claims, 13 Drawing Sheets

(51) Int. Cl.
  *E21B 7/02*     (2006.01)
  *E21B 10/44*    (2006.01)
  *E21B 11/00*    (2006.01)
  *F16H 57/023*   (2012.01)
  *F16H 57/02*    (2012.01)

(52) U.S. Cl.
  CPC .......... *E21B 11/005* (2013.01); *F16H 57/023* (2013.01); *F16H 2057/02039* (2013.01)

(56) References Cited

FOREIGN PATENT DOCUMENTS

| | | |
|---|---|---|
| CN | 108782488 A | 11/2018 |
| CN | 108799464 A | 11/2018 |
| CN | 108807040 A | 11/2018 |

\* cited by examiner

TRANSMISSION MECHANISM FOR ELECTRIC DRILL AND ELECTRIC DRILL INCLUDING THE SAME

CROSS-REFERENCE TO RELATED INVENTIONS

This invention claims the priority of CN application Serial No. 201911318259.X, filed on Dec. 19, 2019, the disclosures of which are hereby incorporated by reference in their entirety.

TECHNICAL FIELD

The present invention relates to a power tool, and particularly to a transmission mechanism for an electric drill and an electric drill including the transmission mechanism.

BACKGROUND ART

Ground drills are widely used in seedling landscaping projects on sandy and hard soil for digging holes. The conventional drills use a two-stroke or four-stroke gasoline engine as the power source, which is easy to access and makes the drills work long hours. However, the vibration and noise of gasoline engine usually makes the operators unbearable, and professional workers are more likely to get occupational diseases after long-term use. Moreover, two-stroke or four-stroke gasoline engines have low energy efficiency, and burning fuels will inevitably generate pollutants. In general, the use of gasoline engines is unfriendly to humans and the environment.

Considering the mobility and the working efficiency, DC electric drill with electric motor powered by batteries becomes more popular in the market. The gear transmission box of the DC electric drill adopts a parallel shaft spur gear transmission mechanism, and when it is used in a high-power application requirements, the modulus of the transmission gear need to be increased, which leads to a large volume of the gear transmission box. Moreover, the load of the transmission gear may be uneven during the transmission process.

In view of the above, there is a need to provide an improved electric drill with a transmission mechanism to solve the problems.

SUMMARY OF INVENTION

An objective of the present invention is to provide a transmission mechanism for an electric drill and the electric drill including the transmission mechanism. The transmission mechanism is not only small in size and easy to assemble, but also has a relatively uniform load during high-power transmission operation, thereby increasing the service life of the transmission mechanism and the electric drill.

In order to achieve the object, the present invention provides a transmission mechanism used for an electric drill, the transmission mechanism comprises: a primary planet carrier having a plurality of primary planetary gear shaft arranged at one end thereof and a sun gear arranged at the other end thereof; a gear assembly comprising a primary gear ring and a primary gear set located in the primary gear ring; a secondary planet carrier comprising a plurality of secondary planetary gear shafts arranged at one end thereof and an output shaft arranged at the other end thereof; and a secondary gear assembly comprising a secondary gear ring and a secondary planetary gear set located in the secondary gear ring; wherein, the primary gear set comprises at least two primary planetary gear sets; the at least two primary planetary gear sets are pivotably mounted on the primary planetary gear shaft, an outer side of the primary planetary gear set engages with the primary gear ring, and an inner side of the primary planetary gear set engages with a central gear arranged on a motor output shaft; wherein, the secondary planetary gear set is pivotably mounted on the secondary planetary gear shafts, an outer side of the secondary planetary gear set engages with the secondary gear ring, and an inner side of thereof engages with the sun gear.

As a further improvement of the invention, the at least two primary planetary gear sets are overlapped in an axial direction of the primary gear ring.

As a further improvement of the invention, each primary planetary gear set has four planetary gears, which are evenly distributed on a periphery of the primary ring gear along the axial direction.

As a further improvement of the invention, the transmission mechanism further comprises a gear box receiving the primary gear assembly and the secondary gear assembly; wherein a positioning ribs are arranged on a side wall of the gear box facing the primary gear assembly c; and wherein a side wall of the primary gear ring or the secondary gear ring facing the positioning ribs comprises a flat wall engaged with the positioning ribs.

As a further improvement of the invention, the number of the positioning ribs is four, and the positioning ribs are evenly distributed on the side wall of the gear box; and wherein the number of the flat walls is four, and the flat walls are evenly distributed on the side wall of the first primary gear ring or the secondary gear ring.

As a further improvement of the invention, the transmission mechanism further comprises a gear box receiving the primary gear assembly and the secondary gear assembly; wherein the gear box comprises an assembling hole; wherein a fixing portion is arranged on side walls of the primary gear ring and the secondary gear ring respectively and extends axially throughout the thickness of the primary gear ring and the secondary gear ring respectively; and wherein the assembling holes and the fixing portion cause the primary gear assembly and the secondary gear assembly to be secured in the gear box through fasteners.

As a further improvement of the invention, the fixing portion comprises a slot on a side facing the side wall of the gear box, and the fixing portion is configured to be a semi-circular slot.

As a further improvement of the invention, a fixing plate is arranged on an end of the primary gear assembly away from the secondary gear assembly so as to limit the primary planetary gear set in the primary gear ring.

As a further improvement of the invention, the fixing plate comprises a main body and an elastic resisting portion extending from the main body, and wherein the elastic resisting portion elastically abuts against the side wall of the gear box.

As a further improvement of the invention, the present invention provides an electric drill, comprising a motor, the transmission mechanism described above, and a drill rod assembled on an output shaft of the transmission mechanism.

The beneficial effects of the present invention are that: the transmission mechanism for the electric drill of the present invention is not only small in size and easy to assemble, but also bears relatively uniform load during high-power transmission, thereby increasing the service life of the transmission mechanism and the electric drill.

In order to achieve above object, the present invention also provides an electric drill, characteristic of comprising a motor, a transmission mechanism as claimed above and a drill rod assembled on an output shaft of the transmission mechanism.

The above general description and the following detailed description are intended to be illustrative and not restrictive.

DESCRIPTION OF EMBODIMENT

Figure 1:
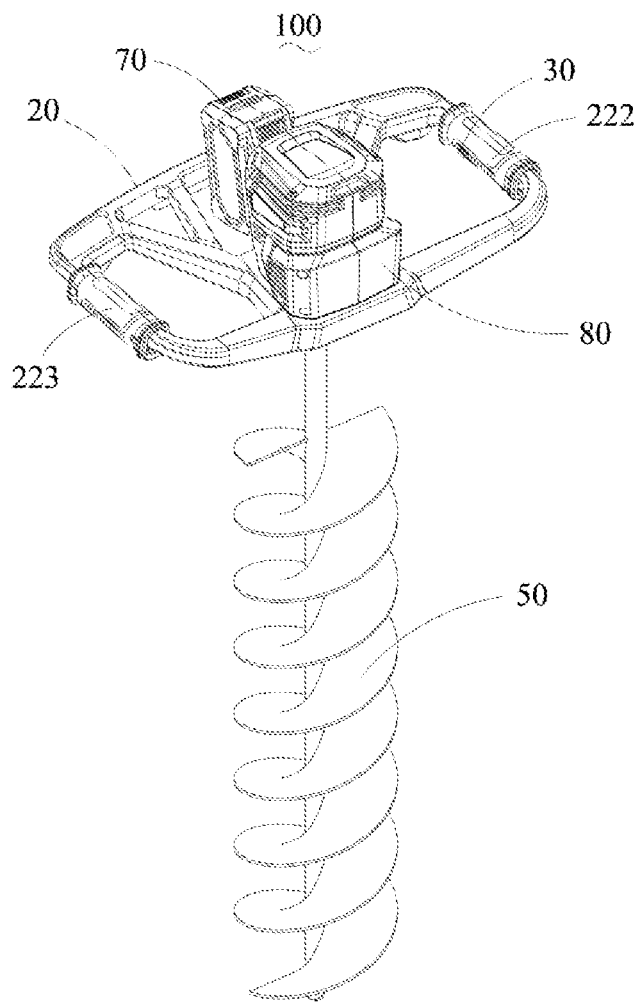
FIG. 1 is a perspective view of an electric drill of the present invention.

The exemplary embodiment will be described in detail herein, and the embodiment is illustrated in the accompanying drawings. When the following description refers to the drawings, unless otherwise indicated, the same numbers in different drawings indicate the same or similar elements. The embodiment described in the following exemplary embodiment does not represent all embodiments consistent with present invention. On the contrary, they are only examples of devices, systems, machines, and methods consistent with some aspects of the invention as detailed in the appended claims.

Reference will now be made to the drawing figures to describe the embodiments of the present disclosure in detail. In the following description, the same drawing reference numerals are used for the same elements in different drawings.

Figure 2:
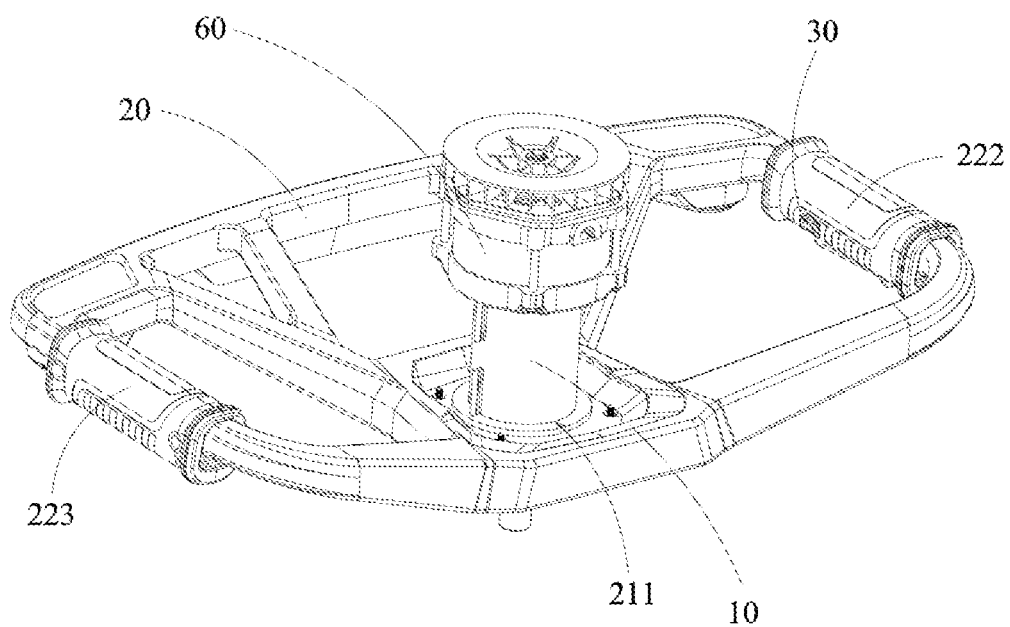
FIG. 2 is a schematic view showing the engagement between a bracket, a motor assembly and a transmission mechanism.
Figure 9:
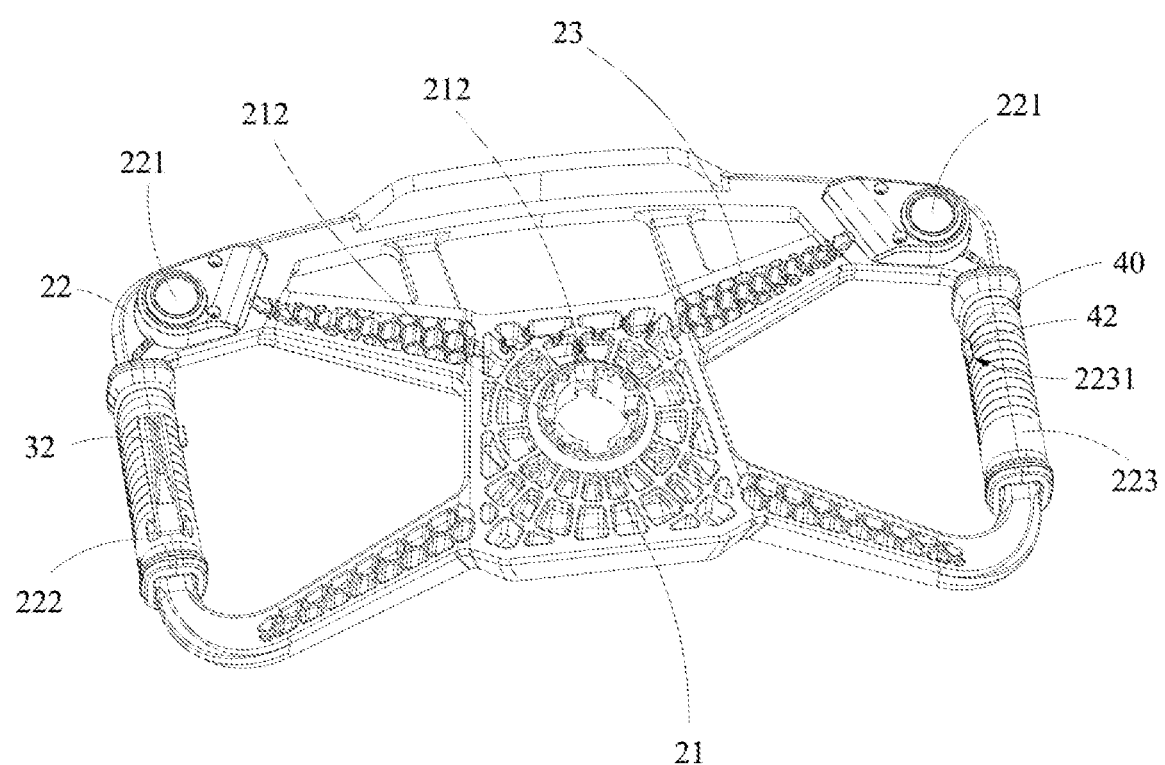
FIG. 9 is a perspective view of the bracket taken from another aspect.

Referring to FIG. 1 and FIG. 2, the present invention discloses an electric drill 100, including a drill rod 50, a motor assembly 60, a battery pack 70 that provides power to the motor assembly 60, a transmission mechanism 10, a bracket 20, a switch assembly 30, and a reversing assembly 40 (as shown in FIG. 9). The drill rod 50 is an operating mechanism for performing the functions of the electric drill 100. The motor assembly 60 drives the drill rod 50 to rotate through the transmission mechanism 10.

Figure 3:
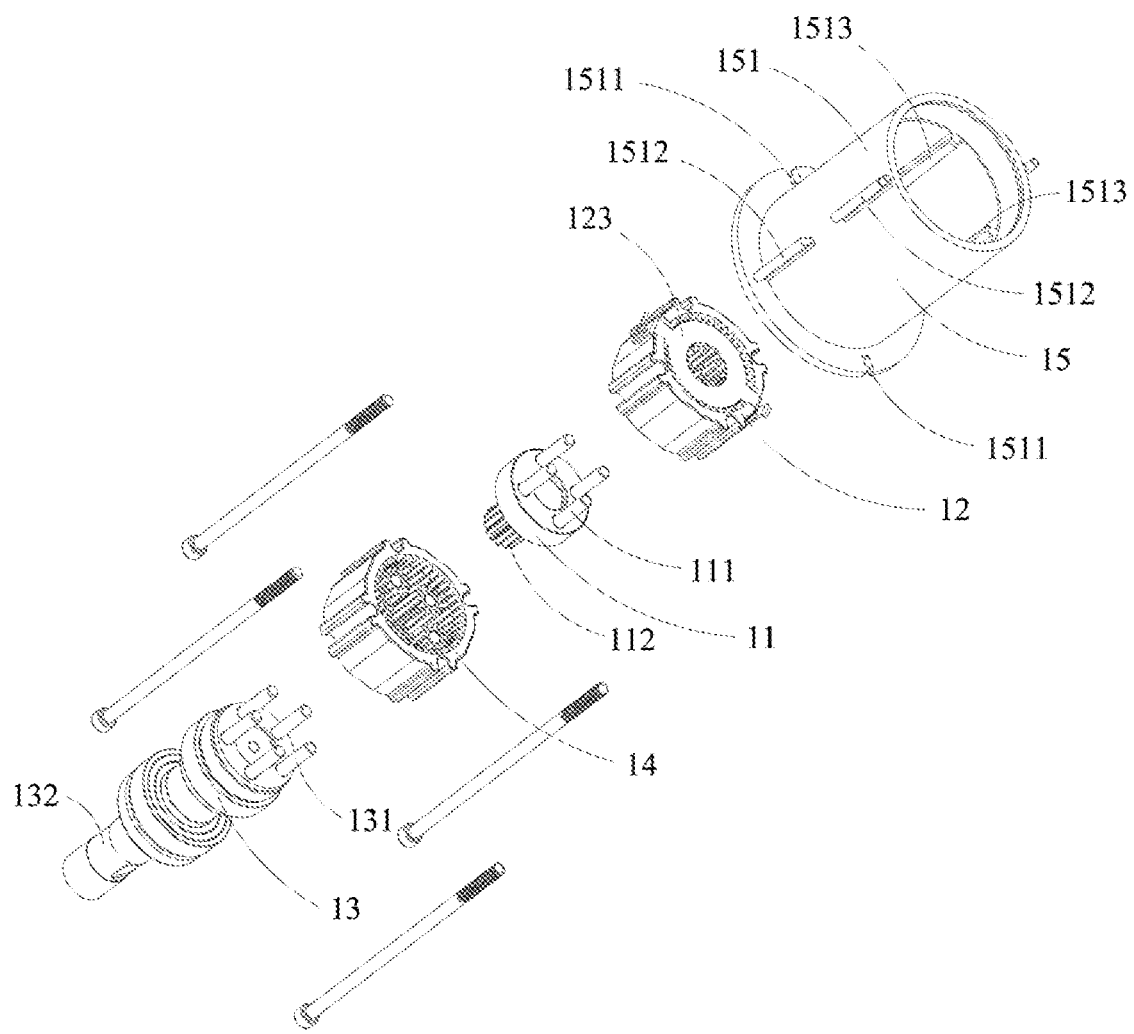
FIG. 3 is an exploded, perspective view of the transmission mechanism.
Figure 4:
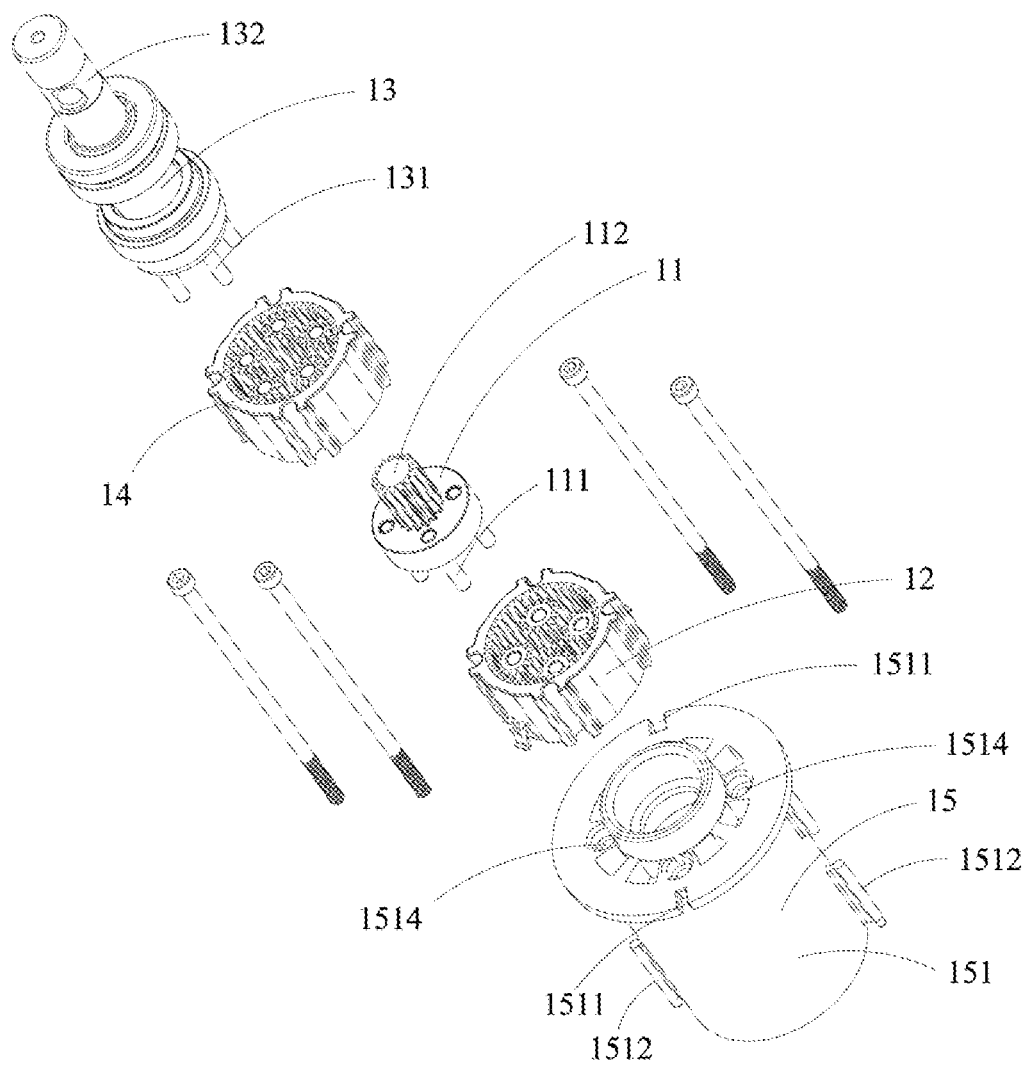
FIG. 4 is an exploded, perspective view of the transmission mechanism taken from another aspect.

Referring to FIG. 3, FIG. 4 and FIG. 2, the transmission mechanism 10 cooperates with the drill rod 50 and the motor assembly 60 so as to transmit the power output by the motor assembly 60 to the drill rod 50. The transmission mechanism 10 includes a gear assembly and a gear box 15 accommodating the gear assembly. The gear assembly includes a primary planet carrier 11, a primary gear assembly 12, a secondary planet carrier 13 and a secondary gear assembly 14. One end of the primary planet carrier 11 comprises a plurality of primary planetary shafts 111 engaged with the primary gear assembly 12, and the other end comprises a sun gear 112 engaged with the secondary gear assembly 14.

Figure 5:
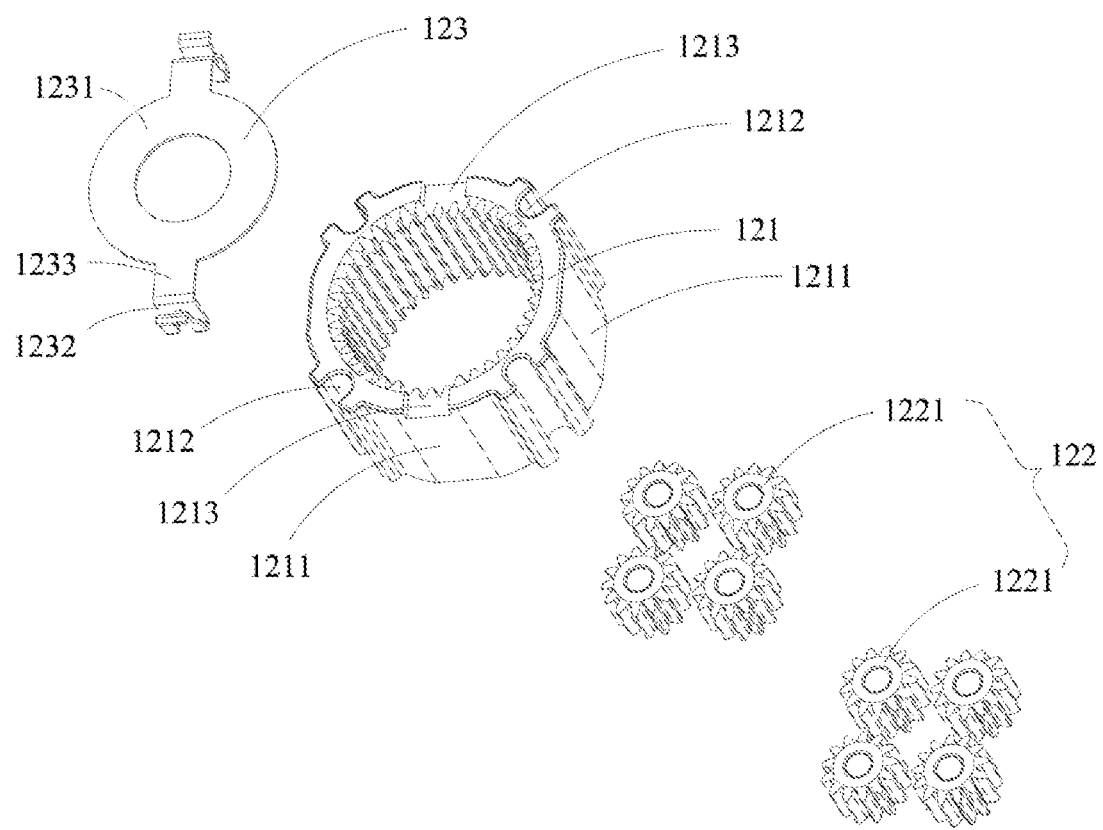
FIG. 5 is an exploded, perspective view of a primary gear assembly.

Referring to FIG. 5, the primary gear assembly 12 includes a primary ring gear 121, a primary gear set 122 located in the primary ring gear 121, and a fixing plate 123. A side wall of the primary gear 121 facing away from the primary gear set 122 comprises flat walls 1211 and a fixing portion 1212 located between the adjacent flat walls 1211. The fixing portion 1212 extends throughout the thickness of the primary ring gear 121 along the axial direction of the primary ring gear 121. The fixing portion 1212 comprises a slot on a side facing a side wall of the gear box 15, and the fixing portion 1212 is configured as a semi-circular portion. An end of the primary ring gear 121 away from the secondary gear assembly 14 comprises a retaining groove 1213. The primary gear set 122 includes at least two groups of primary planetary gear set 1221. The at least two primary planetary gear sets 1221 are overlapped in the axial direction of the primary ring gear 121, and are pivotably mounted on the primary planetary gear shaft 111, and the outer side of the primary planetary gear set 1221 engages with the primary ring gear 121 and the inner side thereof engages with a central gear (not shown) arranged on the output shaft of the motor assembly 60. Each group of the primary planetary gear set 1221 includes four planetary gears, and the four planetary gears are evenly distributed on the peripheral edge of the primary ring gear 121 along the axial direction. In this embodiment, the number of the primary planetary gear set 1221 is two, and each set of the primary planetary gear set 1221 includes four gears, but in other embodiments, the number of the primary planetary gear set 1221 (≥2) and the number of gears contained in each group of the primary planetary gear set 1221 can be arranged as required. Since the primary gear set 122 comprises at least two primary planetary gear sets 1221, the load carried by the primary gear set 122 is relatively uniform, so that the primary planet carrier 11 can withstand a larger load, and can output a stable force. Moreover, the service life of the transmission mechanism 10 can be extended due to the uniform load carried by the primary gear set 122. The fixing plate 123 is located at an end of the primary gear assembly 12 away from the secondary gear assembly 14 to limit the primary planetary gear set 1221 within the primary ring gear 121. The fixing plate 123 includes a main body 1231, an elastic resisting portion 1232 extending from the main body 1231, and a connecting portion 1233 connecting the main body 1231 and the elastic resisting portion 1232. The main body 1231 has an annular shape. The connecting portion 1233 is accommodated in the retaining groove 1213, and the elastic resisting portion 1232 is bend and substantially V-shaped. One end of the elastic resisting portion 1232 facing away from the connecting portion 1233 elastically resists the side wall of the gear box 15, so as to secure the fixing plate 123 in the primary gear assembly 12.

Figure 6:
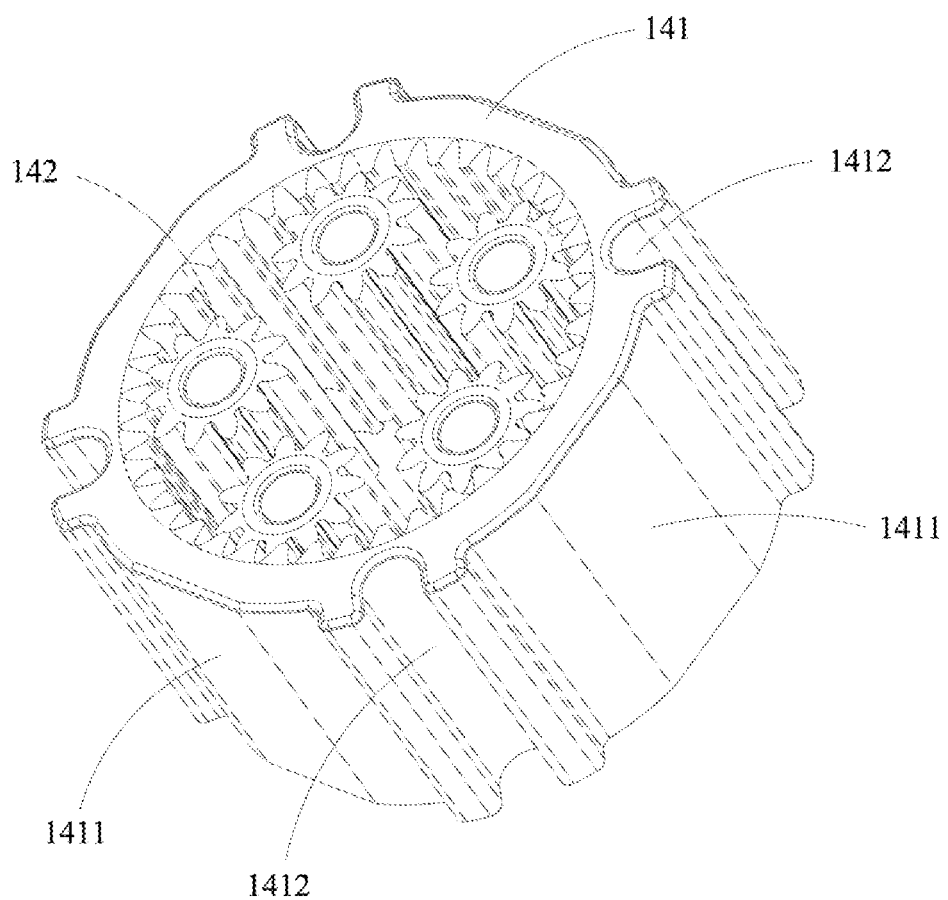
FIG. 6 is a perspective view of a secondary gear assembly.
Figure 7:
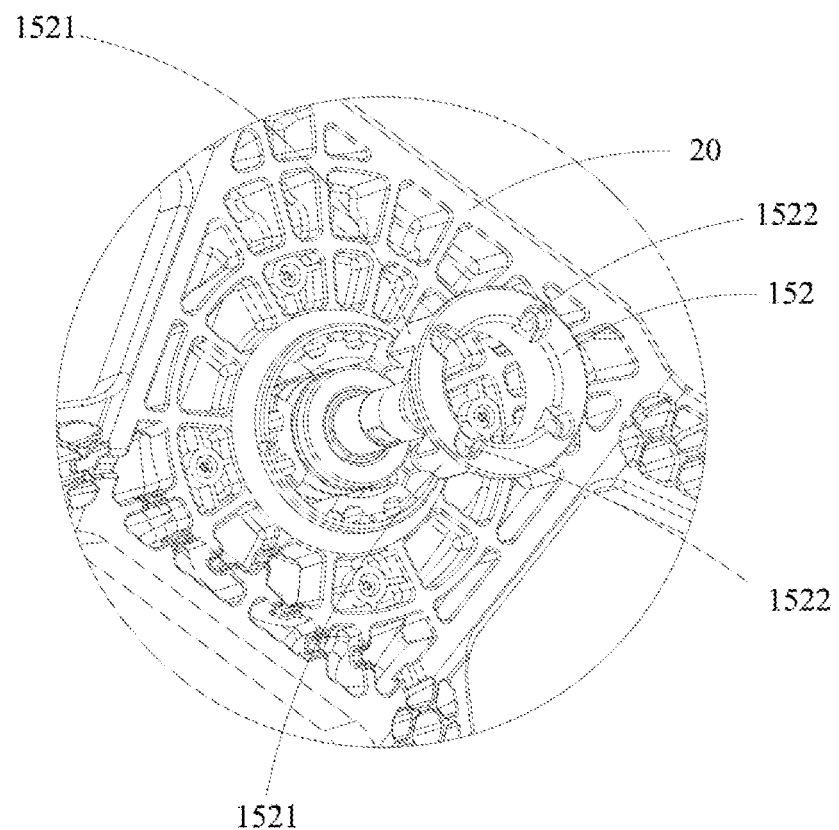
FIG. 7 is a partial enlarged, exploded perspective view of a box cover and the bracket.

Referring to FIGS. 3 and 4, one end of the secondary planetary carrier 13 is provided with a plurality of secondary planetary gear shafts 131 engaged with the secondary gear assembly 14, and the other end is provided with an output shaft 132 engaged with the drill rod 50. Referring to FIG. 6, the secondary gear assembly 14 includes a secondary gear ring 141 and a secondary planetary gear set 142 located in the secondary gear ring 141. A side wall of the secondary ring gear 141 facing away from the secondary planetary gear set 142 comprises a flat wall 1411 and a fixing portion 1412 located between the adjacent flat walls 1411. The fixing portion 1412 extends throughout the thickness of the secondary gear 141 along the axial direction of the secondary gear 141. The fixing portion 1412 comprises a slot on a side facing the side wall of the gear box 15, and the fixing portion 1412 is a configured as a semi-circular slot. The secondary planet gear set 142 is pivotably arranged on the secondary planet gear shaft 131, and the outer side of the secondary planet gear set 142 engages with the secondary ring gear 141 and the inner side thereof engages with the sun gear 112. In this embodiment, the secondary planet gear set 142 includes five gears, but in other embodiments, the number of the gears of the secondary planet gear set 142 can be configurable according to the requirements without limitation. Referring together to FIGS. 3, 4 and 7, the gear box 15 accommodates the primary planet carrier 11, the primary gear assembly 12, the secondary planet carrier 13 and the secondary gear assembly 14, and includes a box body 151 and a box cover 152 matched with the box body 151. The box body 151 and the box cover 152 are respectively located on opposite sides of the bracket 20. The gear box 15 includes a first rotation stopper comprising a first positioning member 1511 disposed on an end of the box body 151 close to the bracket 20 and a first fixing member 1521 disposed on a side of the box cover 152 facing the bracket 20. The box body 151 includes a first resist member 1512 on a sidewall thereof facing away from the gear assembly. A side wall of the box body 151 facing the gear assembly also includes positioning ribs 1513 being in cooperating with the flat wall 1211 and the flat wall 1411. Since the contact surfaces of the flat walls 1211, 1411 and the positioning rib 1513 are flat, the contact area between the box body 151 and the primary gear ring 121 and the secondary gear ring 141 can be effectively increased, and this also makes it easy to assemble the gear box 15, the primary gear ring 121, and the secondary gear ring 141. In the present embodiment, the number of the positioning rib 1513 is four, and they are evenly arranged on the side wall of the box body 151. The numbers of the flat walls 1211, 1411 are both four, and they are evenly arranged on side walls of the primary gear ring 121, the secondary gear ring 141, respectively. In other embodiments, the numbers of the positioning rib 1513, the flat walls 1211, 1411 can be determined according to the requirements without limitation. The box body 151 also includes a box assembling hole 1514 engaging with the fixing portion 1212 and the fixing portion 1412. The box cover 152 has a cover assembling hole 1522. The cover assembling hole 1522, the box assembling hole 1514, the fixing portion 1212 and the fixing portion 1412 engage with each other through a screw, thereby fixing the box body 151, the gear assembly, the box cover 152 together.

Figure 8:
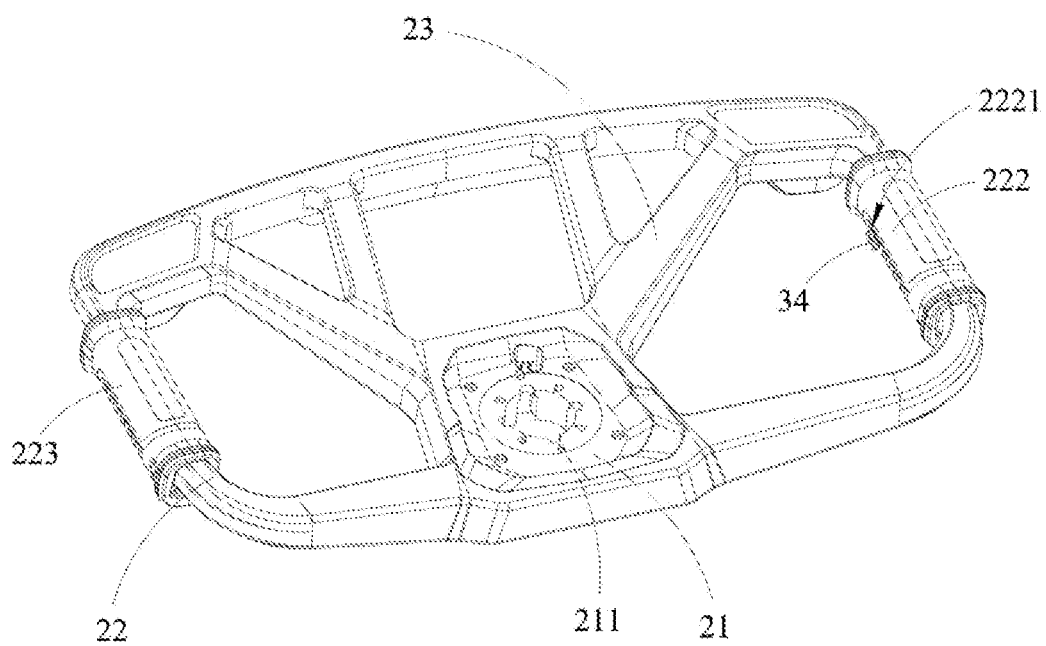
FIG. 8 is a perspective view of the bracket.

Referring to FIGS. 8, 9 and FIG. 7, the bracket 20 includes a mounting portion 21, an operating portion 22 located at the periphery of the mounting portion 21, and a connecting portion 23 connecting the mounting portion 21 and the operating portion 22. The motor assembly 60 and the transmission mechanism 10 are mounted on the mounting portion 21. The mounting portion 21 includes a second rotation stopper that cooperates with the first rotation stopper to transmit the force received by the gear box 15 to the bracket 20. The second rotation stopper includes a second positioning member 211 arranged on a side of the mounting portion 21 facing the box body 151, and a second fixing member 212 arranged on the side of the mounting portion 21 facing the box cover 152. The second positioning member 211 engages with the first positioning member 1511, and the second fixing member 212 engages with the first fixing member 1521, so that the force received by the gear box 15 can be transmitted to the bracket 20 through the first positioning member 1511, the second positioning member 211, the first fixing member 1521, and the second fixing member 212, thereby effectively preventing connection between the gear box 15 and the bracket 20 from loosening. In the present embodiment, the first positioning member 1511 is a positioning recess, and the second positioning member 211 is a positioning protrusion, while in other embodiments, the first positioning member 1511 may also be a positioning protrusion, and the second positioning member 211 can also be a positioning recess matching with the positioning protrusion. In the present embodiment, the first fixing member 1521 is a protrusion extending downwards from the box cover 152, and the second fixing member 212 is a recess matching with the protrusion. The cover assembling hole 1522 is located on the first fixing member 1521.

Figure 10:
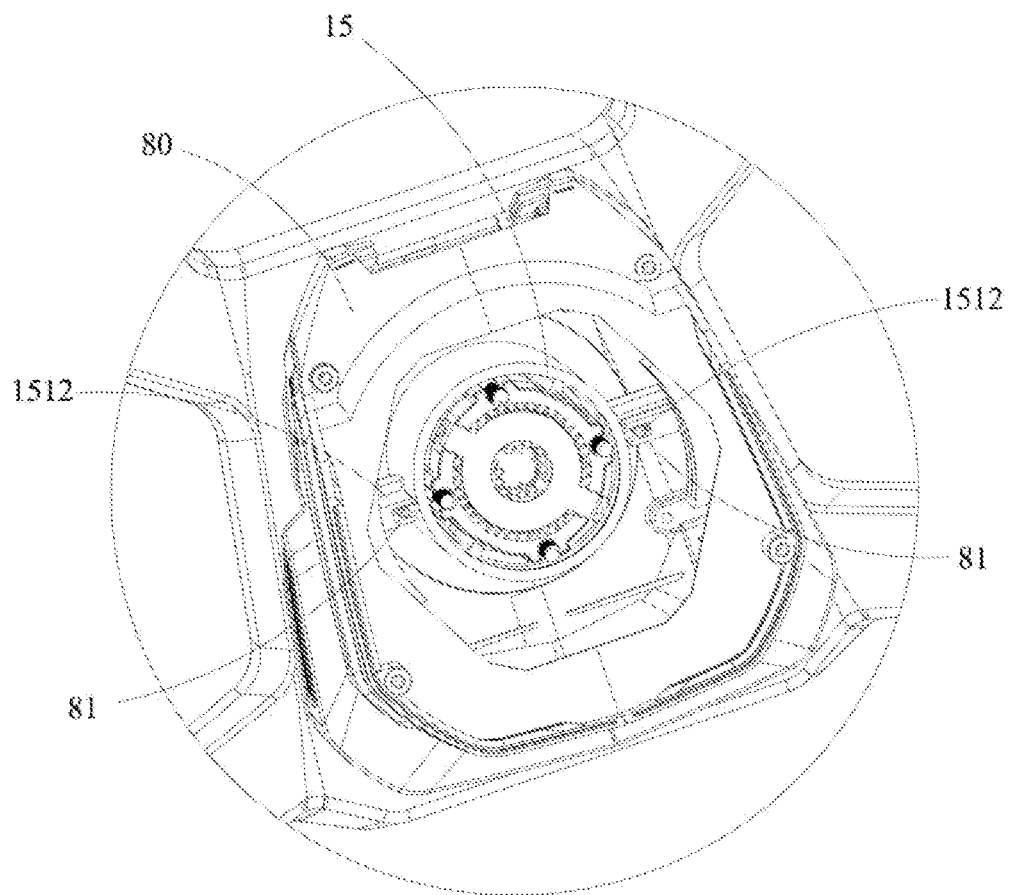
FIG. 10 is a schematic view showing the engagement between the bracket, the transmission mechanism and a shell without top wall.

Referring to FIG. 10 and FIG. 1, the electric drill 100 also includes a shell 80 securely assembled on the bracket 20. The motor assembly 60 and the transmission mechanism 10 are received in the shell 80. A inner side wall of the shell 80 has a second resist member 81 matched with the first resist member 1512. This arrangement makes that the force applied to the gear box 15 can be transmitted to the shell 80 through the first resist member 1512 and the second resist member 81, and indirectly transmitted to the bracket 20, thereby a loosening phenomenon between the gear box 15 and the bracket 20 can be effectively prevented, thus the user experience is effectively improved. In the present embodiment, the first resist member 1512 is a protrusion, and the second resist member 81 is a recess engaging with the protrusion, while in other embodiments, the first resist member 1512 may also be a recess and the second resist member 81 may be a protrusion. The operating portion 22 is substantially rectangular, and an illumination lamp 221 is positioned on a side of the operating portion 22 facing the drill rod 50. In this embodiment, the number of the illumination lamps 221 is two, and they are located at one end of the operating portion 22 close to the battery pack 70. Preferably, the number of the illumination lamps 221 is four, and they are located at four corners of the operating portion 22 respectively. By such an arrangement, a wide range of illumination area can be obtained, and the light emitted by the illumination lamp towards the working area can not be blocked by the drill rod 50, thereby effectively improving the user experience. The operating portion 22 is also provided with a pair of handles, including a first handle 222 and a second handle 223 disposed opposite to each other.

Figure 11:
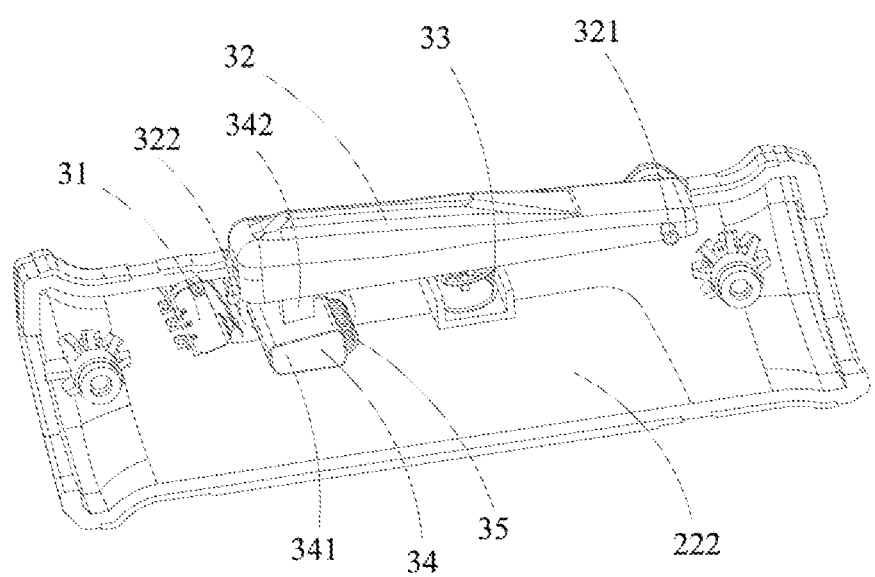
FIG. 11 is a structural schematic view of a switching assembly.
Figure 12:
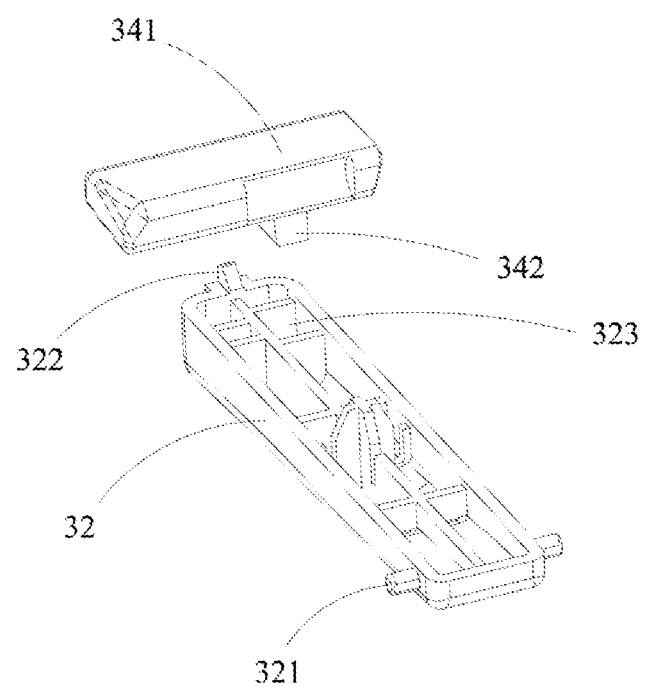
FIG. 12 is a schematic view showing an engagement between a switch and a self-locking button.

Referring to FIG. 11, FIG. 12 and FIG. 1, the switch assembly 30 is assembled on the first handle 222, and includes a first micro switch 31, a switch 32, a switch reset elastic element 33, a self-locking button 34, and a self-locking button reset elastic element 35. The first micro switch 31 is configured to activate or deactivate the motor assembly 60. The switch 32 is pivotably mounted on the handle 222 through a pivot 321, and an end of the switch 32 facing away from the pivot 321 is provided with an abutting block 322 that cooperates with the first micro switch 31. A receiving groove 323 is arranged on a side of the switch 32 facing the self-locking button 34. One end of the switch reset elastic element 33 abuts against the first handle 222 and the other end abuts against the switch 32. The self-locking button 34 includes a base 341 and an abutting arm 342 located on a side of the base 341 facing the switch 32, and the abutting arm 342 is cooperating with the receiving groove 323. One end of the self-locking button reset elastic element 35 abuts against the self-locking button 34, and the other end abuts against the first handle 222. Referring to FIG. 8, a through hole 2221 is arranged on a side of the first handle 222 facing the motor assembly 60, and the self-locking button 34 partially protrudes from the through hole 2221 so as to be pressed by the operator.

The button 34 is configured in such a way that: when the self-locking button 34 is in the first state, the self-locking button 34 abuts against the switch 32 to prevent the switch 32 from rotating around the pivot 321; when the self-locking button 34 is in the second state, the self-locking button 34 is out of contact with the switch 32, and the switch 32 can rotate around the pivot 321. Specifically, when the self-locking button 34 is pressed (i.e., in the second state), the self-locking button reset elastic element 35 is elastically deformed, and the self-locking button 34 moves into the first handle 222 so that the abutting arm 342 and the receiving groove 323 are in alignment. At this time, pressing the switch 32 causes the switch 32 to rotate around the pivot 321. The switch reset elastic element 33 is elastically deformed, and the abutting arm 342 enters into the receiving groove 323, and the abutting block 322 abuts against the first micro switch 31, so that the first micro switch 31 is activated. When the switch 32 is released, the switch 32 is reset under the action of the switch reset elastic element 33; when the self-locking button 34 is released, the self-locking button 34 is reset under the action of the elastic element 35 (i.e., in the first state). At this time, the abutting arm 342 and the receiving groove 323 are misaligned, and the abutting arm 342 abuts against the switch 32, so that the switch 32 cannot rotate around the pivot 321. Therefore, the electric drill 100 of the present invention will not be activated by accidentally touching the switch 32, and a safety operation of the electric drill 100 is achieved. In the present embodiment, the moving direction of the self-locking button 34 from the first state to the second state is parallel to the axial direction of the pivot 321, while in other embodiments, the moving direction from the first state to the second state of the self-locking button 34 may also be configured to be perpendicular to the axial direction of the pivot 321.

Figure 13:
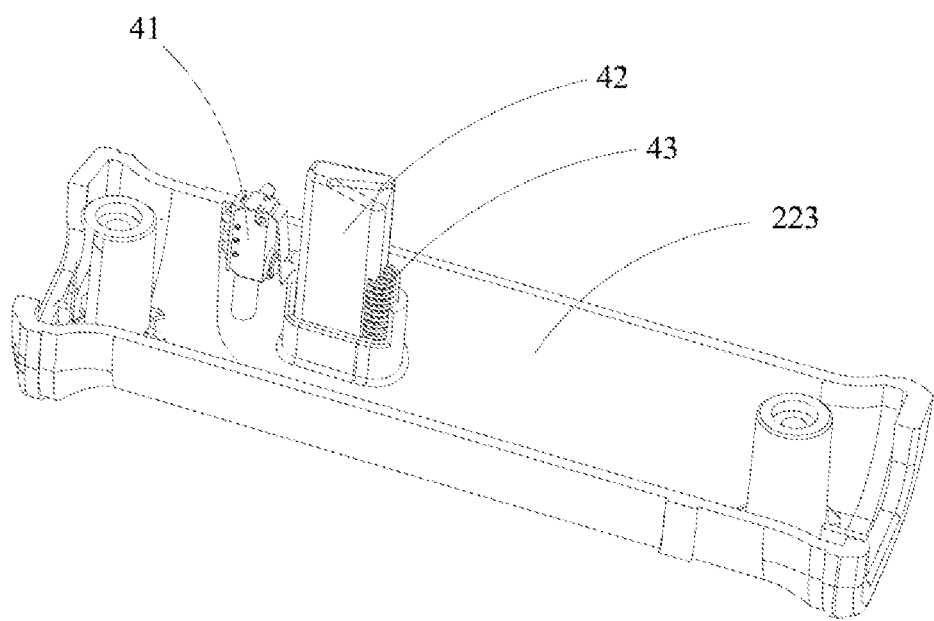
FIG. 13 is a structural schematic view of a reverse assembly.

Referring to FIG. 13 and FIG. 9, the reversing assembly 40 is disposed on the second handle 223, and includes a second micro switch 41, a reversing button 42 engaged with the second micro switch 41, and a reversing button reset elastic element 43. The second handle 223 is provided with a groove 2231 for accommodating the reversing button 42. The reversing button 42 partially protrudes from the groove 2231, and the protruding portion thereof is located on a side of the second handle 223 facing the motor assembly 60. When the reversing button 42 is pressed, the reversing button 42 retracts into the groove 2231, the reversing button reset elastic element 43 is elastically deformed, and the reversing button 42 abuts against the second micro switch 41 so that the second micro switch 41 is triggered. When the reversing button 42 is released, the reversing button 42 is reset under the action of the reversing button reset elastic element 43. In this embodiment, the second micro switch 41 is configured in such a way that: the motor assembly 60 reverses when and only when the first micro switch 31 and the second micro switch 41 are both triggered at the same time. With this arrangement, it is possible to prevent the electric drill 100 from reversing due to accidentally touching the reversing button 42, thereby effectively improving the safety factor. In this embodiment, after any one of the first micro switch 31 and the second micro switch 41 is triggered, the illumination lamp 221 is turned on.

Compared with the prior art, the electric drill 100 of the present invention comprising the at least two primary planetary gear sets 1221 enables the load applied onto the transmission mechanism 10 to be uniform during a high-power transmission operation, so that the service life of the transmission mechanism 10 and thus the electric drill 100 can be prolonged.

The above embodiment is only used to illustrate present invention and not to limits the technical solutions described in present invention. The understanding of this specification should be based on those skilled in the art, although present invention has been described in detail with reference to the above embodiment. However, those skilled in the art should understand that those skilled in the art can still modify or equivalently replace present invention, and all technical solutions and improvements that do not depart from the spirit and scope of present invention should be within the scope of the claims of the invention.

What is claimed is:

1. An electric drill, comprising a motor, a transmission mechanism, and a drill rod assembled on an output shaft of the transmission mechanism, the transmission mechanism comprising:
    a primary planet carrier having a plurality of primary planetary gear shafts arranged at one end thereof and a sun gear arranged at the other end thereof;
    a primary gear assembly comprising a primary gear ring and a primary gear set located in the primary gear ring;
    a secondary planet carrier comprising a plurality of secondary planetary gear shafts arranged at one end thereof and an output shaft of the secondary planet carrier arranged at the other end thereof; and
    a secondary gear assembly comprising a secondary gear ring and a secondary planetary gear set located in the secondary gear ring;
    wherein, the primary gear set comprises at least two primary planetary gear sets; the at least two primary planetary gear sets are pivotably mounted on the primary planetary gear shafts, an outer side of the primary planetary gear set engages with the primary gear ring, and an inner side of the primary planetary gear set engages with a central gear arranged on a motor output shaft;
    wherein, the secondary planetary gear set is pivotably mounted on the secondary planetary gear shafts, an outer side of the secondary planetary gear set engages with the secondary gear ring, and an inner side of the secondary planetary gear set engages with the sun gear.

2. The electric drill of claim 1, wherein the at least two primary planetary gear sets are overlapped in an axial direction of the primary gear ring.

3. The electric drill of claim 2, wherein each primary planetary gear set has four planetary gears, which are evenly distributed on a periphery of the primary ring gear along the axial direction.

4. The electric drill of claim 1, wherein the transmission mechanism further comprises a gear box receiving the primary gear assembly and the secondary gear assembly; wherein positioning ribs are arranged on a side wall of the gear box facing the primary gear assembly c; and wherein a side wall of the primary gear ring or the secondary gear ring facing the positioning ribs comprises a flat wall engaged with the positioning ribs.

5. The electric drill of claim 4, wherein the number of the positioning ribs is four, and the positioning ribs are evenly distributed on the side wall of the gear box; and wherein the flat wall comprises four flat walls, and the four flat walls are evenly distributed on the side wall of the first primary gear ring or the secondary gear ring.

6. The electric drill of claim 1, wherein the transmission mechanism further comprises a gear box receiving the primary gear assembly and the secondary gear assembly; wherein the gear box comprises assembling holes; wherein a fixing portion is arranged on side walls of the primary gear ring and the secondary gear ring respectively and extends axially throughout the thickness of the primary gear ring and the secondary gear ring respectively; and wherein the assembling holes and the fixing portion cause the primary gear assembly and the secondary gear assembly to be secured in the gear box through fasteners.

7. The electric drill of claim 6, wherein the fixing portion comprises a slot on a side facing the side wall of the gear box, and the fixing portion is configured to be a semi-circular slot.

8. The electric drill of claim 6, wherein a fixing plate is arranged on an end of the primary gear assembly away from the secondary gear assembly so as to limit the primary planetary gear set in the primary gear ring.

9. The electric drill of claim 8, wherein the fixing plate comprises a main body and an elastic resisting portion extending from the main body, and wherein the elastic resisting portion elastically abuts against the side wall of the gear box.

* * * * *